(12) United States Patent
Huang et al.

(10) Patent No.: US 8,764,875 B2
(45) Date of Patent: Jul. 1, 2014

(54) METHOD AND APPARATUS FOR COPRODUCTION OF PIG IRON AND HIGH QUALITY SYNGAS

(76) Inventors: Xiaodi Huang, Houghton, MI (US); Jiann-Yang Hwang, Chassell, MI (US)

( * ) Notice: Subject to any disclaimer, the term of this patent is extended or adjusted under 35 U.S.C. 154(b) by 230 days.

(21) Appl. No.: 13/197,096

(22) Filed: Aug. 3, 2011

(65) Prior Publication Data

US 2012/0031232 A1 Feb. 9, 2012

Related U.S. Application Data

(60) Provisional application No. 61/496,733, filed on Jun. 14, 2011, provisional application No. 61/393,521, filed on Oct. 15, 2010, provisional application No. 61/400,850, filed on Aug. 3, 2010.

(51) Int. Cl.
*C21B 11/00* (2006.01)
*C01B 3/24* (2006.01)
*B01J 19/12* (2006.01)

(52) U.S. Cl.
USPC ....... 75/10.13; 75/10.22; 75/10.28; 75/10.39; 75/10.46; 75/10.61; 75/10.63; 585/240

(58) Field of Classification Search
USPC ........... 75/10.13, 10, 22, 10.28, 10.39, 10.46, 75/10.61, 10.63; 585/240
See application file for complete search history.

(56) References Cited

U.S. PATENT DOCUMENTS

| | | | |
|---|---|---|---|
| 3,437,474 A * | 4/1969 | Imperato | .......................... 75/771 |
| 4,906,290 A | 3/1990 | Worner | |
| 6,277,168 B1 | 8/2001 | Huang et al. | |
| 7,381,230 B2 | 6/2008 | Rapler et al. | |
| 7,452,392 B2 | 11/2008 | Nick et al. | |
| 7,658,155 B2 | 2/2010 | Chapman et al. | |
| 7,674,443 B1 | 3/2010 | Davis | |
| 7,717,971 B2 | 5/2010 | Aaberg-Petersen et al. | |
| 7,736,400 B2 | 6/2010 | Rabovitser et al. | |
| 2002/0177745 A1 | 11/2002 | Bullock | |
| 2004/0060387 A1 | 4/2004 | Tanner-Jones | |
| 2005/0191233 A1 | 9/2005 | Jiang et al. | |
| 2006/0124445 A1 | 6/2006 | Labrecque et al. | |
| 2006/0228294 A1 | 10/2006 | Davis et al. | |
| 2007/0102279 A1 | 5/2007 | Novak | |
| 2008/0069765 A1 | 3/2008 | Jiang et al. | |
| 2008/0087135 A1* | 4/2008 | Hwang et al. | ................ 75/10.13 |
| 2008/0277265 A1 | 11/2008 | Tsangaris et al. | |
| 2012/0029252 A1* | 2/2012 | Lissianski et al. | ............ 585/240 |

FOREIGN PATENT DOCUMENTS

WO PCT/AU88/00437 11/1988
WO WO/2008/051356 2/2008

OTHER PUBLICATIONS

Microwave. (n.d.). Dictionary.com Unabridged. Retrieved Aug. 20, 2013, from Dictionary.com website: http://dictionary.reference.com/browse/microwave.*

* cited by examiner

*Primary Examiner* — George Wyszomierski
*Assistant Examiner* — Tima M McGuthry Banks
(74) *Attorney, Agent, or Firm* — John R. Benefiel

(57) ABSTRACT

Combined microwave heating and plasma/electric arc heating is utilized in several processes and apparatus which involve co-production of pig iron and high quality syngas, biomass to liquid fuel production, coal to liquid fuel production, co-gasification of biomass and coal, municipal solid waste treatment, waste-to-energy (agriculture waste, ASR and PEF), EAF dust and BOF sludge treatment to recover zinc and iron, hazardous bottom ash vitrification, and bromine, chlorine and sulfur removal/recycling.

27 Claims, 6 Drawing Sheets

METHOD AND APPARATUS FOR COPRODUCTION OF PIG IRON AND HIGH QUALITY SYNGAS

CROSS REFERENCE TO RELATED APPLICATION

This application claims the benefit of U.S. provisional application No. 61/496,733 filed on Jun. 14, 2011; No. 61/393,521 filed on Oct. 15, 2010; and No. 61/400,850 filed on Aug. 3, 2010, the content of which is hereby incorporated by reference.

BACKGROUND OF THE INVENTION

This invention relates to a process and apparatus for reducing and smelting iron ore and generating syngas of a controlled high quality composition.

Petroleum has been regarded as the center of any future energy crisis. To assure the future supply of energy, technologies for converting carbon containing materials such as biomass and coal to liquid fuels have long been investigated due to their vast abundance. Gasification of biomass and coal to a gas product rich in carbon monoxide and hydrogen is typically the first step of the conversion. The conventional gasification process involves the partial oxidation of the carbon containing materials with oxygen separated from the air. The reactor is commonly an autoclave that can facilitate the high pressure and high temperature reactions.

Both the air separator for oxygen production and the high pressure-high temperature reactor involve high capital and operation costs, and thus make such gasification a very expensive process.

The gasification product usually contains 10%-30% carbon dioxide in addition to the carbon monoxide and hydrogen. Carbon dioxide needs to be removed to yield a syngas product that is almost entirely made up of carbon monoxide and hydrogen. Syngas is the starting material for many chemical reactions that lead to the production of many useful chemical compounds such as gasoline, diesel, plastics, fertilizers, and other substances.

The current syngas generation technologies typically rely on combustion of a fuel to heat materials.

U.S. Pat. No. 7,381,230 discloses a process for the production of syngas from a feed stream comprising a hydrocarbon containing gas and an oxygen containing gas.

U.S. Pat. No. 7,452,392 discloses a process for the conversion of organic waste material such as municipal trash, sewage, post-consumer refuse, and biomass into syngas.

U.S. Pat. No. 7,717,971 discloses a process for the production of syngas from a hydrocarbon feed stock using a steam reforming system.

U.S. Pat. No. 7,736,400 discloses a method for producing a gas comprising substantial amounts of methane, hydrogen and/or carbon monoxide from a solid carbonaceous material and an oxygen carrier using a non-thermal plasma reactor at a temperature in a range of about 300° C. to 700° C.

U.S. Pat. No. 7,658,155 discloses a process for treatment of waste by gasification in the presence of oxygen end steam or pyrolysis to produce an offgas and treating the offgas in a separated plasma unit in the presence of oxygen and steam.

U.S. patent application Ser. No. 20080277265 discloses a process for reformulating an initial gas into a reformulated gas having designed for characteristics by applying a gas energizing field sufficient to reformulate the majority of the gaseous molecules into their constituents and promoting efficient process acceleration for the reformulation of the constituents into a reformulated gas of designed for characteristics.

Published U.S. patent application Ser. No. 20080069765 discloses a method for catalytic partial oxidation of hydrocarbons with an oxygen containing gas to produce syngas.

Published U.S. patent application Ser. No. 20060228294 discloses a method for producing syngas using a molten metal bath by injecting feed materials directly into the molten metal bath, injecting oxygen and steam into the vessel enclosing the molten metal bath, removing produced syngas continuously, and removing molten metal and vitreous material periodically.

Published U.S. patent application Ser. No. 20070102279 discloses a method tor reducing organic compounds into carbon and gases by microwave energy.

Published U.S. patent application Ser. No. 20060124445 discloses an electrical heating reactor for hydrocarbon gas reforming by passing the hydrocarbon gas and an oxidant gas through a porous but electrically conductive lining material connected between two electrodes. An electrical source is used to power the electrodes and resulting in generation of an electronic flux in the conductive lining and heating the lining.

Published U.S. patent application Ser. No. 20050191233 discloses a process for catalytic partial oxidation of hydrocarbons to produce a syngas.

The above patents or published patent applications teach only syngas productions from carbonaceous or organic materials, and do not describe co-production of syngas and metal.

U.S. Pat. No. 7,674,443 discloses an integrated process for gasifying a carbonaceous source using steam and oxygen gas and producing nanoscale metallurgical powder through carbochlorination using chlorine gas as a reacting and carbon monoxide as an oxygen sink.

U.S. published patent application Ser. No. 2002177745 discloses a method for processing waste materials into more desirable products by the expedient of breaking down these materials into their stable molecular constituents and reforming them into more desirable substances in two chambers with microwave radiation, lasers, masers, and/or ultrasonic energy.

Currently, steels are produced by two types of operations: integrated mills and minimills. In the integrated mill, sintered iron ore pellets, coke and lime are charged into a blast furnace (BF). Air is blown at high speed to combust the coke to generate carbon monoxide and heat. Sintered iron ore pellets are reduced to hot metal by carbon monoxide and melted to form liquid pig iron. The liquid iron is then sent to a basic oxygen furnace (BOF) where pure oxygen is blown into the liquid iron to remove excessive carbon and convert the iron into steel. The fundamental problems associated with this production route are the needs for coke and intensified combustions. Coke making is one of the most polluting of industrial processes and intensified combustion generates a great amount dust and waste lot of energy in the exhaust gases.

Minimills employ electric arc furnaces (EAF) to melt steel scrap and/or DRI (direct reduced iron) and produce generally lower quality steel. Minimills traditionally enjoyed an abundant supply of steel scrap. However, recent rapid economic growth of major developing countries has caused shortage of steel scrap supply.

Currently, DRI is produced by three types of processes: gas/shaft, gas/fluid bed, and Coal/RHF (rotary hearth furnace) or RKF (rotary kiln furnace). In a gas/shaft process such as Midrex or HYL, iron ore powder is heated and reduced into iron powder in a shaft with a hot reducing gas which is derived from reforming natural gas. In a gas/fluid bed process such as Fior or FINMET, iron ore powder is heated and reduced into iron powder in a series of fluidized-bed reactors with a hot reducing gas which is also derived from reforming natural gas, In a coal/RHF or RKF process such as FASTMET or INMETCO, pellets of iron ore and carbonaceous powders are heated by combustion of a fuel in a rotary hearth furnace or a rotary kiln. The carbonaceous material functions as the reducing agent to reduce the iron ore pellets into iron sponges. The gas/shaft process dominates the DRI production at present. The price and uncertain supply of natural gas have caused operational difficulties in many DRI plants.

In addition to producing DRI by solid reaction, there are several iron smelting processes such as COREX, Hismelt and Mesabi Nugget which produce molten iron or involve iron smelting using coal, natural gas or oil as the combustion fuel or heating source.

All of the above technologies rely on external heating of the materials through conduction, convection and radiation from a heating source.

U.S. Pat. No. 4,906,290 discloses a method of drying and heating a mixture of particulate ores with an oxygen-containing carbonaceous material using microwave energy to initiate reduction reaction of the ores. In this method, solid oxide wastes can be treated in the same manner as the particulate ores to recover selected elements.

U.S. Pat. No. 6,277,168 discloses a new steelmaking technology based on the use of microwave energy. This technology can produce DRI, iron or steel from a mixture, consisting of iron oxide fines, powdered carbon and fluxing agents. This technology is projected to eliminate many current intermediate steelmaking steps, such as coking, sintering, BF ironmaking, and BOF steelmaking. In this technology, Zn, Pb, Sn, Cd and Fe bearing by-products such as BOF sludge and EAF dust can be treated in a similar manner as iron ore concentrates to extract valuable metals.

Published U.S. patent application Ser. No. 2004/70060387 discloses a process for the reduction of a metalliferous ore or concentrate using a microwave induced plasma.

PCT/AU88/00437 discloses a method for microwave irradiation of mineral ores and concentrates to produce metallic droplets.

All of the above patents and patent applications have no concurrent steel and gaseous fuel production.

Steelmaking by-products such as EAF dust and BOF sludge cannot be disposed directly because both by-products contain high level of zinc and the highly toxic lead and cadmium. Several THMR (high temperature metal recovery) technologies have been disclosed to teach the methods of treating the by-products by heating them with a combustion source in a reducing condition in a furnace. The zinc and cadmium exist in the form of oxides which are be reduced, volatized, re-oxidized and captured b a gag house connected to the furnace exhaust. The most successful of the HTMR technologies is the Waelz kiln process.

U.S. patent application Ser. No. 10/950,260 filed on Sep. 24, 2004, now U.S. Pat. No. 7,227,882 teaches a method of preheating a mixture of EAF dust and a quantity of carbon to between 100° C. and 200° C. with a conventional heating method. The preheated dust is then heated by microwave in a microwave compatible kiln until zinc in the preheated dust vaporized to form a metal vapor and a residue. The zinc vapor is then condensed or oxidized and captured by a bag house. The residue is removed from the microwave kiln and further heated to form a molten material. The quantity of carbon is determined by the percentage of zinc.

There is no syngas produced in the process described in that application.

In published international application Ser. No. WO 2008/051356 by the present inventors, there is a suggestion of producing syngas after an initial reduction of iron oxide using microwave energy and carbon preferably coal as a reducing agent. The syngas is comprised of CO produced by a reaction of excess carbon and oxygen released from the iron oxide in being reduced in a first microwave heating zone and $H_2$ produced from hydrocarbons and moisture in the coal in a second zone of heating, both reactions enhanced by the presence of metallic iron produced by the reduction of iron oxide.

However, it would be desirable to control the composition of the syngas to insure a major $H_2$ component as well as CO to which is easily convertible to liquid fuels such as gasoline.

It is an object of the present invention to improve the methods and apparatus described in PCT WO 2008/051356 by increasing their efficiency and output and to produce a high quality syngas able to be easily converted to liquid fuels, and also to include an ability to control the composition of such high quality syngas.

SUMMARY OF THE INVENTION

This invention discloses a method using a combined successive microwave heating and plasma/electric arc heating in separate zones for several methods which include co-production of pig iron and high quality syngas, biomass to liquid production, coal to liquid production, co-gasification of biomass and coal, municipal solid waste treatment, waste-to-energy, EAF (electric arc furnace) dust and BOF (basic oxygen furnace) sludge process to recover zinc and iron, hazardous bottom ash vitrification, and bromine, chlorine and sulfur removal/recycling.

In the co-production of pig iron and syngas, iron oxide fines are mixed with a carbon containing material such as coal or biomass or organic wastes which hold substantial quantities volatile hydrocarbons such as methane and also moisture to form a feed mixture. The feed mixture is charged into an air tight chamber of reactor in a relatively shallow thickness with successive heating in microwave and plasma/electric arc heating zones. The mixture is initially quickly heated up to elevated temperatures by microwave irradiation in the first zone due to its good microwave absorbing capability. The iron oxide fines are reduced by the carbon present to become an electrically conductive mass of partially reduced DRI.

The DRI is conveyed to the plasma/electric arc second heating zone in the air tight reactor chamber where it is quickly heated to a much higher temperature to complete the reduction of the iron oxide in the feed mixture and melt the iron formed thereby to form pig iron nuggets. The exhaust gases generated by the microwave heating are constrained to also pass through the high temperature plasma/electric arc second heating zone where the mixture is heated to a sufficiently high temperature to melt the DRI and to reform, decompose and/or react the exhaust gases generated by the first stage of heating, resulting in an off-gas of a CO and $H_2$ mixture. After cleaning, the off-gas becomes a high quality syngas. The reactor can be a rotary hearth, a rotary kiln, a shaft furnace, a conveyer furnace, or a traveling grate furnace with combined microwave and plasma/electric arc heating or other microwave assisted hybrid heating.

In the conversion of biomass or organic wastes to syngas, the feed material is shredded to less than 2", mixed with a microwave absorbing material, and fed into the air tight reactor chamber with subsequent successive microwave and plasma/electric arc heating. The feedstock is quickly pyrolyzed by microwave heating, resulting in the production of combustible gases, oil vapor, steam, and charcoal. The exhaust gases are forced to pass through and the charcoal travels to the high temperature plasma/electric arc heating zone to reform, decompose or react, resulting in an off-gas of CO and $H_2$ mixture. Additional treatments of the syngas in small auxiliary reactors may be carried out. After such treatments and cleaning, the off-gases are converted to a high quality syngas suitable for conversion to liquid fuels.

EAF dust and BOF sludge also can be processed using the method of this invention to recover Zn and Fe, and produce syngas and a ceramic material. In this application, EAF dust or BOF sludge is preferably mixed with a low volatile carbon bearing material to form a mixture. The mixture is charged into the reactor and heated by microwave irradiation to elevated temperatures. Upon heating, zinc oxide in the dust or sludge is reduced, melted and vaporized into the exhaust gases. The zinc vapor condenses to form zinc particles in the reducing atmosphere. The zinc particles are collected by a bag house. Upon continuous heating, the remaining iron oxide in the dust or sludge is reduced to form DRI.

Further heating by a plasma/electric arc heater turns the DRI into pig iron nuggets. The exhaust gases after reforming, decomposing and reacting during the heating plasma/electric arc and in the presence of the melted iron and carbon at the elevated temperatures become an off-gas of CO and $H_2$ mixture. After cleaning, the off-gas becomes a high quality syngas. Additional materials can be blended into the dust or sludge to form a feed material for controlling the slag composition in order to create a marketable ceramic material.

BRIEF DESCRIPTION OF THE DRAWINGS

The invention is further described with reference to the several views of the drawings wherein, without limiting the scope of the claimed invention:

DETAILED DESCRIPTION

Figure 1:
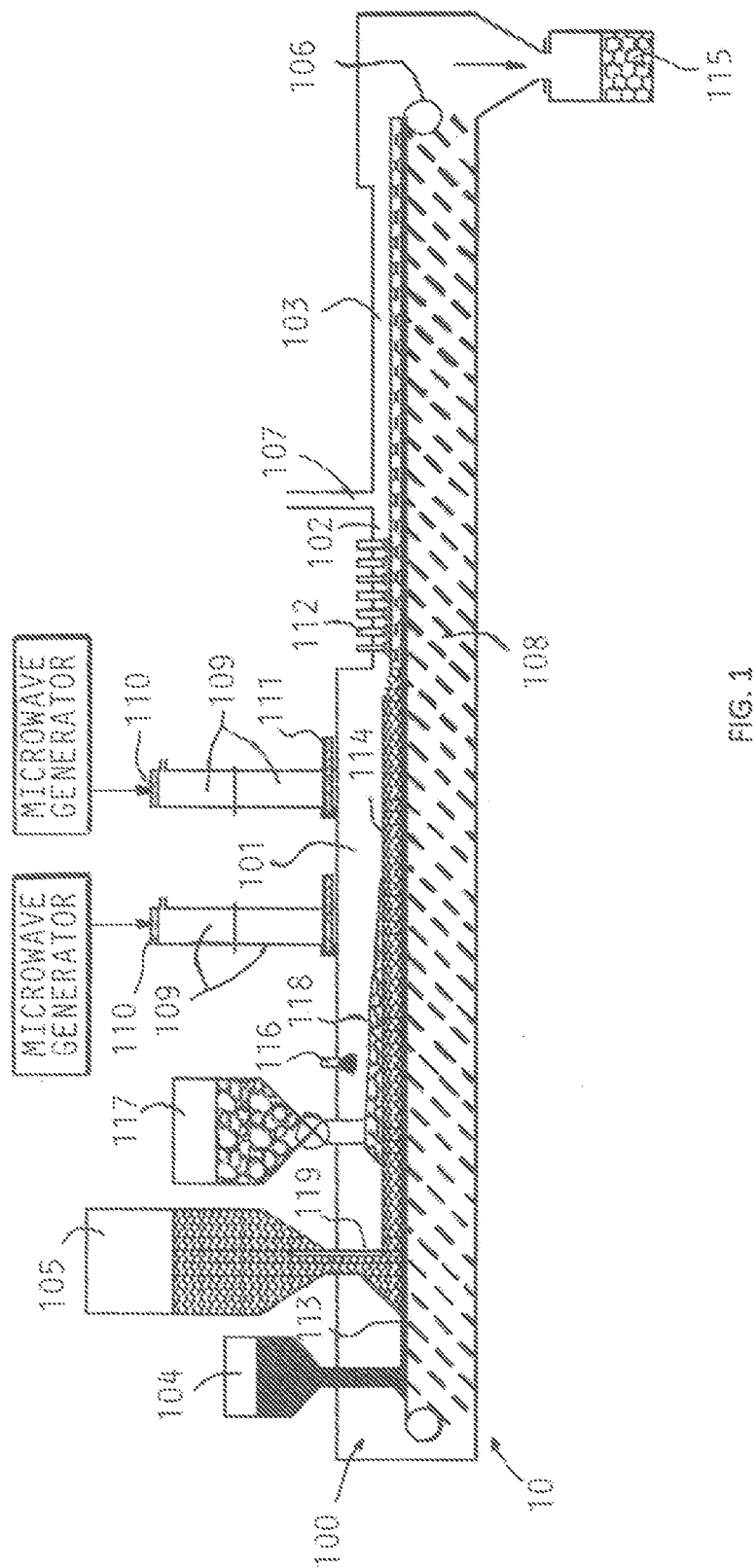
FIG. 1 is a diagrammatical representation of a combination microwave/plasma arc furnace suitable for carrying out a process according to the invention.
Figure 2:
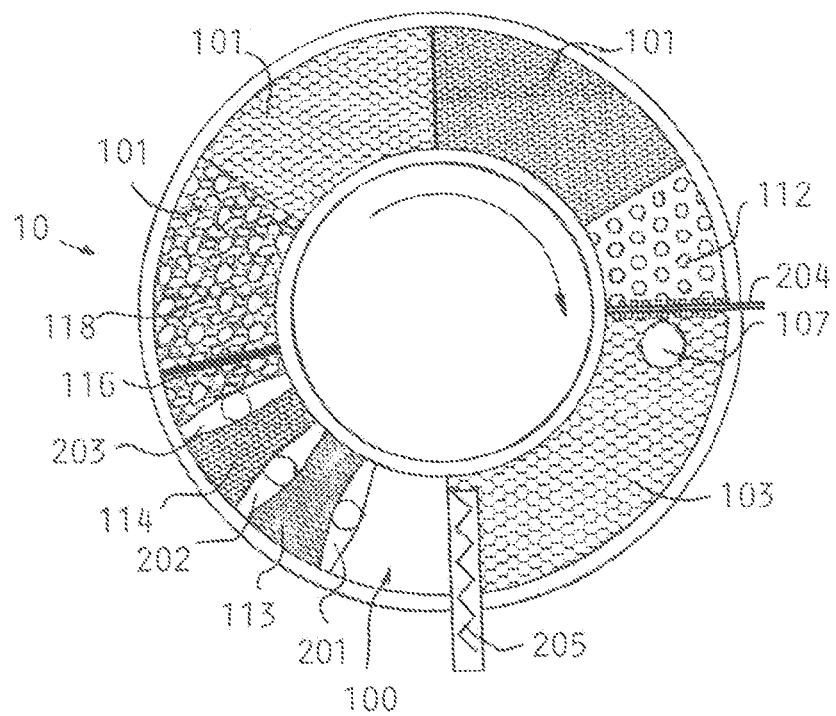
FIG. 2 is a plan diagrammatical view of a combination microwave plasma arc rotary hearth furnace suitable for carrying out the invention.

In the practice of this invention, an air tight furnace capable of continuous operation is provided, the furnace 10 as depicted in FIG. 1, has a chamber 100 having a microwave heating zone 101, a gas constraint plasma/electric arc second heating zone 102, a cooling zone 103, a material feeding system comprising of a bottom carbon feeding port 104, a primary feedstock feeding port 105, a solid product discharging mechanism 106, a gaseous product exporting port 107, and a continuous traveling hearth covered with refractory layer 108 of a thickness preferably over one half microwave length. Preferably, the furnace has a rotary hearth 90 having an OD and an ID to form a microwave/plasma arc rotary hearth furnace 10A as shown in FIG. 2.

As an alternative, the furnace may be comprised of a microwave heating chamber and a separated plasma/electric arc heating chamber which are connected to form an integrated furnace as described below.

Figure 3:
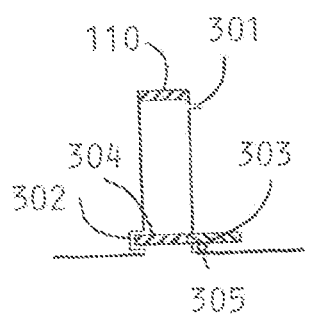
FIG. 3 is an enlarged cross sectional view of a gas purging waveguide shown in FIG. 1 with a gas blowing, reliable cleaning, and easy replacement window.

Microwaves are introduced into the microwave heating zone 101 through waveguide segments 109. The segments 109 are connected in an air tight manner to link each microwave generator as shown to the heating zone 101 of the chamber 100. Two microwave transparent windows 303, 304 (FIG. 3) are installed in the integrated piece of the waveguide, one near the generator end 110 and one at the entrance to the zone 101. The waveguides segments 109 are purged continuously with an inert gas, CO, $H_2$ or syngas through a port 301 as shown in FIG. 3 to prevent air from getting into the furnace chamber 100 if the window is broken. Otherwise, there may be an explosion if air is mixed with the produced syngas at an elevated temperature. The surface of the entrance window facing the chamber interior is cleaned continuously with a gas, preferably the same waveguide purging gas, introduced through a U turn mechanism 302. The entrance window 300 is comprised of two identical halves 303 and 304, and both are slidably mounted in a frame, one in the working position and the other 304 in a cleaning and replacing position. Each sliding cycle reverses the positions of the two halves 303, 304 and also cleans the window halves 303, 304 with a brush 305. The sliding motion can be driven by an air cylinder (not shown) and controlled automatically. If damaged, each half window 303, 304 can be replaced readily without interrupting the operation. The window cleaning brush 305 and easy replacement make the microwave heating suitable to deal with the dusty, humid and smoky chamber environment.

To produce pig iron nuggets and high quality syngas, a bottom carbon charging mechanism 104 is connected to the furnace chamber 100. Multiple, precisely arrayed plasma single or twin electrode torches 112 are installed in the plasma/electric arc heating zone 102, preferably arranged in multiple rows and multiple columns with arc spaces between 0.5" and 12.0", preferably 1.0" and 2.0", and of even or gradually descending heights. The cross sectional area of the plasma/electric arc heating zone 102 is reduced from the microwave heating zone 101 to ensure that substantially all of the exhaust gas is rapidly heated by the ultra high temperature plasma arcing.

The plasma gas can be $H_2$, CO, syngas, $H_2O$ steam, or an inert gas. Optionally each torch can use a different plasma gas. The spacing between the ceiling of the plasma/electric arc heating zone and the top surface of the feedstock layer is between 0.25" and 12", preferably in the range between 0.5" to 2.0". The plasma/electric arc heating zone length is sufficient to form molten pig iron and complete in-situ reforming, thermal cracking and reaction with residual carbon with the exhaust gases to form a high quality syngas.

To isolate the feedstock charging port 105 from the syngas exporting port 107 and facilitating uni-directional flow of gases to the syngas exporting port 107, the chamber 101 has at least one dynamic material curtain 201, 202 and 203 (FIG. 2). To facilitate pig iron nugget formation, the furnace hearth 90 rotates in a stepped manner. Both stop durations and rotation distances are adjustable. Also, the chamber 100 may have a gas injector 204 installed (FIG. 2) with multiple openings immediately after the plasma/electric arcing zone 102 to blow-cut the molten pig iron and slag into pieces, or installed with a water cooled and horizontally rotated shaft with multiple arms to cut molten pig iron and slag into pieces.

In the practice of the invention, iron ore (an iron oxide) is mined, crushed, ground and concentrated by a separation process to increase iron content. The concentrated fine particles of iron ore, preferably at least finer than 100 mesh, and preferably finer than 325 mesh, are mixed with fine particles of a carbon containing material preferably at least finer than 100 mesh, preferably finer than 200 mesh, such as pulverized coal, and a hydrogen-containing compounds either as fine solid particles or as liquid in a certain ratio. Bituminous coal will typically have substantial moisture and volatile hydrocarbon content, mostly methane, to provide a substantial hydrogen content in the exhaust gases.

The correct ratio of feedstock components is determined by analyzing the iron oxide content in the iron ore and the fixed carbon content in the pulverized coal sufficient to complete reduction of the iron oxide by the fixed carbon, mixing the above materials in the ratio being able to remove oxygen completely from the iron oxide and to form iron with carbon content between 2.06 to 6.67%, preferably around the eutectic 4.3% in order to lower the melting point of the iron, and to yield a syngas with the $H_2/CO$ ratio preferably in the range from 0.5 to 3.0, preferably around 2%. The mixture is used as the feed material in the form of loose powdered masses or of agglomerates with a binder.

The carbon particles are charged into the furnace chamber 100, distributed over the bottom refractory 108 in a layer 113 of a depth between 0.25" to 2.0", preferably 0.5" to 1.0" thick, through the bottom carbon charging mechanism 104. The carbon layer 113 serves as an insulator between the refractory 108 and the molten pig iron as well as a microwave receptor. Next, the feedstock mixture is charged in a 0.5" to 12" layer 114, preferably around 1.5" thick, into the air tight chamber over the bottom carbon layer 113. The depth of the feed mixture layer 114 is established using a sliding gate 119. Three processes happen during the successive heatings: iron ore partial reduction in first zone and, iron smelting, and in-situ reforming/thermal cracking/partial oxidation of the exhaust gases and carbon to form the syngas composition.

As to the iron ore partial reduction, firstly, microwave energy heats the layer 114 of the iron ore and feedstock coal mixture to approximately 800° C. in a few minutes. During microwave heating, the coal serves as the reducing agent for the iron oxide, and an auxiliary heating source via an exothermal oxidation reaction of the carbon and as the hydrogen source for the syngas generation. The iron oxide serves as the source of iron for steel production as well as the source of oxygen for the carbon partial reaction to form CO which acts as the main reduction agent. A distinction over conventional coal gasification, the oxygen comes from iron oxide (chemical looping) instead of from pure oxygen produced by an oxygen plant.

During the microwave heating, iron ore is quickly partially reduced into direct reduced iron (DRI). After DRI is formed, the feed material becomes a poor microwave absorber due to the formation of networked metallic iron. The microwave heating is designed to result in approximately 50-70% metallization with high heating efficiency. Volatiles in the coal (primarily methane, $CH_4$) and steam are also released during the initial heating process.

Next, the iron and carbon content in the feedstock can be controlled to form the Fe-C eutectic composition (4.26%C) through the feedstock recipe. At the eutectic composition, the melting point of the Fe-C alloy is 1154° C.

Plasma arc heating takes over after the microwave heating to complete the iron ore reduction and melt the eutectic or near eutectic Fe-C material (pig iron). The combination of a furnace hearth step rotation, or a material advance step travel, with the arrayed plasma torch arrangement, the molten pig iron forms nuggets without dead corners. It may also utilize a gas injector 204 (FIG. 2) to blow-cut or the horizontally rotated shaft with multiple arms to cut the molten pig iron and slag into pieces. The ash in the coal and the impurities in the iron ore form slag. The slag composition can be adjusted by adding fluxing agents in the feed to form a slag suitable for desulphurization and dephosphorization with lower melting point, lower viscosity, proper basically, and easy separation from the pig iron nuggets after cooling.

The remaining underlying carbon layer 113 functions as an isolator between the molten nuggets and the stag from the refractory base 108 and facilitates discharging the produced nuggets and slag from the refractory base through an auger 205 (FIG. 2) and collected in a tank 115 (FIG. 1). The produced pig iron nuggets can be used as a feed material for ferrous foundries or steelmaking using conventional electric arc furnaces.

At 800° C. and above, iron functions as a catalyst to promote the transformation of methane, other hydrocarbons water vapor and bio-oil vapor into $H_2$ and CO. The plasma/electric arc heating zone 102 comprises an in-situ reforming zone 102. This zone is constructed by lowering the ceiling of the furnace chamber and reducing the cross section area of gas flow to force the gases into better contact with the fresh iron nugget surfaces.

At elevated temperatures in the carbon enriched microwave reduction zone 101, which are required for fast iron ore reduction, most water and $CO_2$ react with carbon to form $H_2$ and CO. In the in-situ reforming zone 102 with plasma heating to even higher temperature, (i.e., the melting point of the iron) such environment further ensures complete reactions of residual water vapor and $CO_2$ with residual carbon, such as layered bottom carbon and for biomass char, to also form $H_2$ and CO.

In this technology, the entire heating and reaction process takes place in a continuous and enclosed system. Because no air is required for combustion and the process is controlled by the Bouduard Equation, only the $H_2$ and CO are generated through in-situ reforming of exhaust gases produced by the microwave heating. Thus, a high quality syngas can be produced. The biomass composition, moisture level, and the equilibrium phase diagram of iron oxides, iron, CO, and $CO_2$ vs. temperature can be used as references to control the off-gas composition.

Because there is no significant combustion heating, the off-gas is of lower temperature and contains less particulate. The off-gas is then passed through a cleaning system to further cool down, remove particulates, adjust $H_2/CO$ ratio by water gas shift (WGS), recover sulfur, and separate $H_2O$ and $CO_2$, becoming a clean syngas. Because there are no steam or combustion required, syngas production has fewer problems related to $H_2O$ separation and $NO_x$ formation. This syngas can be converted to a gaseous fuel such as gasoline and diesel using the Fischer-Tropsch or Mobil process or other chemicals.

Various reactions in the mixture can be written as:

$$CO_2 + C = 2CO \tag{1}$$

$$H_2O + C = CO + H_2 \tag{2}$$

-continued $$H_2O + CH_4 \xrightarrow{Fe} CO + 3H_2 \quad (3)$$

$$CO_2 + CH_4 \xrightarrow{Fe} 2CO + 2H_2 \quad (4)$$

$$3Fe_2O_3 + H_2 = 2Fe_3O_4 + H_2O \quad (5)$$

$$Fe_3O_4 + H_2 = 3FeO + H_2O \quad (6)$$

$$FeO + H_2 = Fe + H_2O \quad (7)$$

$$3Fe_2O_3 + CO = 2Fe_3O_4 + CO_2 \quad (8)$$

$$Fe_3O_4 + CO = 3FeO + CO_2 \quad (9)$$

$$FeO + CO = Fe + CO_2 \quad (10)$$

From these equations, we can see that all the oxygen can be supplied by iron oxide (Eq. 5 to 10) in an air tight microwave reactor. When the temperature is above 1000° C., only CO and $H_2$ can co-exist with carbon (Bouduard Equation) and there will be no $CO_2$ and $H_2O$ in existence (Eq. 1 and 2). The volatiles from the biomass will be reformed to CO and $H_2$ during the process with the presence of the reduced iron (Eq. 3 and 4). Therefore, the net products in the microwave/plasma reactor would be only iron, CO and $H_2$. This theoretically achieves a 100% carbon efficiency versus the 30% in the conventional process. There will be no need for an oxygen separator, a steam generator, or high pressure-high temperature reactor as the conventional gasification requires, neither the coke nor the environmental scrubbing system for the steel production.

In one option, the chamber 100 may have a hydrogen-containing compound injection port 116 (FIG. 1). An additional hydrogen-containing mixture such as $H_2O$ and waste oil is injected into the chamber to increase $H_2/CO$ ratio, to react with the carbon containing particles and bottom carbon particles, and increase syngas output.

In a preferred form, the chamber 100 may have a port 117 for charging biomass or organic waste. Additional biomass or organic waste pieces are charged into the chamber in a layer 118 between 0.25" to 2" thick over the layer 114 of the main feedstock mixture as a thermal insulator to reduce heat lost, utilize heat more efficiently, increase syngas output, and facilitate carbon reaction with excessive steam and $CO_2$ especially in the plasma/electric arcing zone 102. Subjected to heat, the biomass or organic waste release exhaust gases and leave a porous charcoal layer. The charcoal will react with residual water vapor and $CO_2$ to generate more syngas in the plasma arc heating zone 102.

Figure 1A:
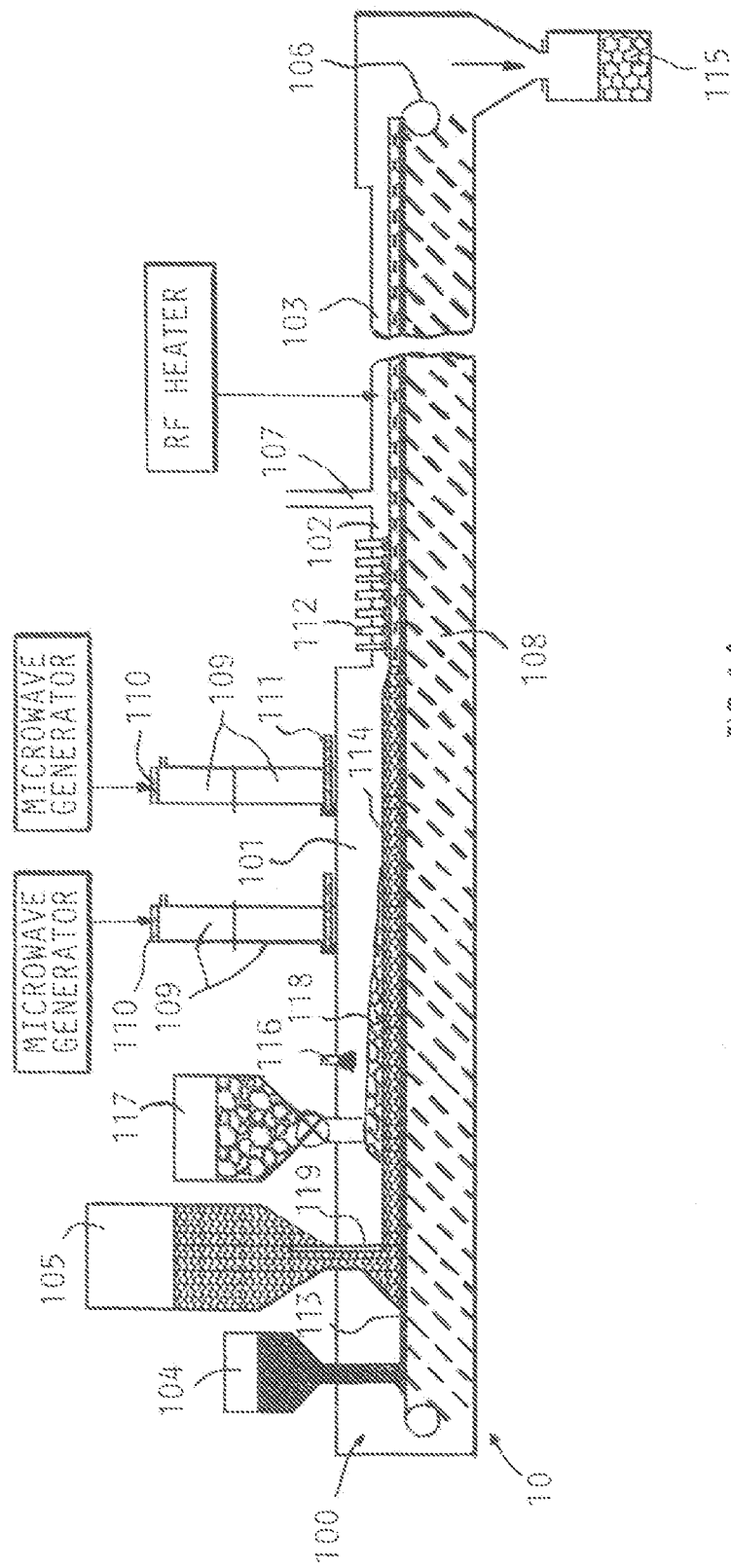
FIG. 1A is a diagrammatical view of a variation of the furnace shown in FIG. 1.

The chamber 100 may also have an induction heating zone 102A (FIG. 1A) preferably heated by an RF (radio frequency heater as shown in FIG. 1A), after the plasma/electric arcing zone 102. The plasma/electric arcing carries out the initial smelting to form metal beads and the RF induction heating completes the smelting to form molten pig iron and slag. Other ways of further heating the metal beads could be added for various purposes.

The chamber 100 may also have a charcoal discharging mechanism prior to the plasma/electric arcing zone 102. The biomass/organic waste charcoal could be discharged before transported to the plasma/electric arcing zone 102. The charcoal would be pulverized replacing a part of the carbon-bearing particles in the feedstock or the bottom carbon layer 113.

Figure 4:
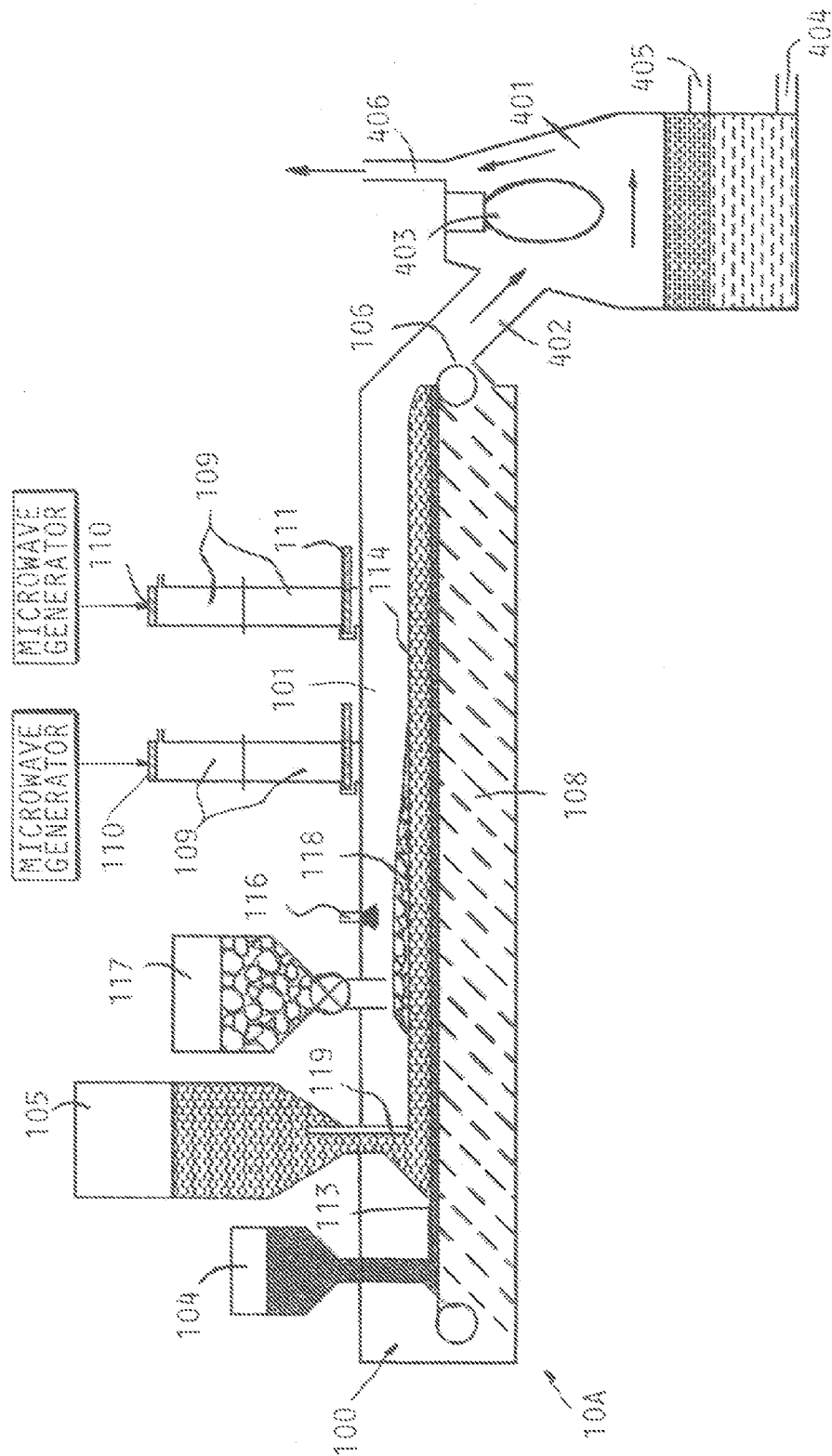
FIG. 4 is a diagrammatical representation of an alternative form of a microwave/plasma arc furnace.

An alternative apparatus is shown in FIG. 4, which apparatus is basically the same at that described above for the co-production of pig iron nuggets and high quality syngas, except that the plasma/electric arc heating zone comprises a further separated shaft reactor 401 which is connected to the solid production discharging port 402 of the microwave heating chamber 101 to receive DRI and all of the exhaust gases, and has at least one plasma arc torch 403. The separate plasma arc heating reactor 401 is air tight connected with a DRI receiving port, a molten pig iron discharging port 404, a molten slag discharging port 405, and a syngas exporting port 406, which is located near the plasma arc and creating a counter flow between the plasma gas and the exporting gas. The shapes, sizes, locations, and structures of the plasma arc heating and syngas exporting mechanism ensure that the syngas will be subjected to the plasma are high temperature heating before being exported. The combined microwave rotary hearth chamber and the plasma shaft reactor form the integrated microwave rotary hearth plasma arch shaft furnace.

The feedstock mixture is charged in a 0.5" to 12" thick laser, preferably around 4.0", into the chamber 100 and then transported into the reactor 401. Three processes happen during the successive heating stages, iron ore partial reduction to become DRI, iron smelting, and in-situ reforming/thermal cracking/partial oxidation.

The same results as described above occur, i.e., co-production of pig iron nuggets and high quality syngas. After the partial reduction by microwave heating, the resulted DRI and the exhaust gases are discharged and exported into the connected plasma arc heating reactor 401 immediately.

The hot DRI is heated by electrical plasma arcing until the reduction of iron oxides is completed and molten pig iron and slag are formed. The molten pig iron and slag are discharged respectively.

The exhaust gases including volatiles, steam, $CO_2$ and other gases which decompose or react to form a mixture of CO and $H_2$ when subjected to high temperature plasma arcing. The excessive steam and $CO_2$ react with remaining carbon to form CO and $H_2$ with the $H_2/CO$ ratio in the range of 0.5 to 3.0 and hydrocarbons. $CO_2$, $H_2O$ and $O_2$ less than 5%, preferably 1% respectively. The resulting syngas is exported into a cleanup system (not shown) to remove impurities and create a high quality syngas.

The feedstock mixture is charged in a 0.5" to 12" thick layer, preferably around 4.0", into the microwave heating zone and then transported into the PA-SF reactor. Three processes happen during the heating: iron ore partial reduction to become DRI, iron smelting, and in-situ reforming/thermal cracking/partial oxidation of the exhaust gases.

After the partial reduction by microwave heating, the resulted DRI and the exhaust gases are discharged and exported into the connected plasma arc heating reactor 401 immediately.

The hot DRI is further heated therein by plasma arcing until the reduction of iron oxides is completed and molten pig iron and slag are formed. The molten pig iron and slag are discharged respectively.

The exhaust gases including volatiles, steam, $CO_2$ and other gases decompose or react to form a mixture of CO and $H_2$ when subjected to high temperature plasma arcing. The excessive steam and $CO_2$ react with remaining carbon to form CO and $H_2$ with the $H_2/CO$ ratio in the range from 0.5 to 3.0 and hydrocarbons, $CO_2$, $H_2O$ and $O_2$ less than 5%, preferably 1%, respectively, The resulting syngas is exported into a cleanup system to remove impurities and becoming a high quality syngas.

The invention maybe used to produce high quality syngas from various biomasses, coals, hydrogen-containing compounds, and organic wastes including municipal solid waste, agriculture waste, forest wastes, used tires, automobile shredder residue, and process engineered fuel.

The same apparatus described above for the co-production of pig iron nuggets and high quality syngas may be used for the direct conversion of biomass, coal and organic wastes to syngas but with less microwave power and plasma arc power needed. A horizontally rotated agitation bar can be installed near the plasma/electric arc heating zone to facilitate the reaction of residual carbon with the exhaust gases.

A bulky carbon-bearing material such as biomass, coal or organic waste, preferably also containing hydrogen, is processed to reduce size smaller than 2.0", preferably smaller than 0.5". The processed material is mixed with fine microwave absorbing material, such as high temperature treated carbon particles smaller than 3 mesh, preferably finer than 100 mesh as a microwave receptor. To increase hydrogen content in produced syngas, other hydrogen-containing compounds in either solid or liquid such as $H_2O$ and waste oil may also be added. The three materials are mixed in the ratio being able to absorb microwave energy effectively and result in a syngas with the $H_2/CO$ ratio in the range from 0.5 to 3.0, preferably around 2.0.

The feedstock is charged into the chamber continuously in a 0.5" to 24" thick layer over the refractory base, preferably around 2.0 to 6.0" thick. Two processes happen during the heating:hydrocarbon pyrolysis and in-situ reforming/thermal cracking/partial oxidation.

The feedstock is pyrolized by being subjected to microwave irradiation to release exhaust gases and leave charcoal behind. The charcoal is transported and the exhaust gases are forced into the adjacent and constraint plasma/electric arc heating zone.

The exhaust gases including hydrocarbons in volatile and oil vapor, steam, $CO_2$ and other gases decompose to react to form a mixture of CO and $H_2$ when subjecting to high temperature plasma arcing (in-site reforming). The excessive steam and $CO_2$ react also with charcoal to form CO and $H_2$ under the high temperature (carbon partial oxidation) with plasma gas agitating to form a syngas with the $H_2/CO$ ratio in the range from 0.5 to 3.0 and hydrocarbons, $CO_2$, $H_2O$ and $O_2$ less than 5%, preferably 1%, respectively.

The remaining charcoal is transported to an adjacent cooling zone and discharged and the syngas is exported into a cleanup system to remove impurities and become a high quality syngas. The discharged charcoal is pulverized and a part of it is fed back as the high temperature treated carbon particles in the feedstock mixture.

In addition, carbon particulates may be charged into the chamber in a layer between 0.25" to 2.0", preferably 0.5" to 1.0", prior to charging the feedstock mixture into the chamber, serving as a bottom carbon and microwave receptor.

As noted above, the chamber 100 may have an hydrogen-containing compound injection port 116. In this case., an additional hydrogen-containing compound may be injected into the chamber 100 to react with the high temperature treated carbon particles and the bottom carbon particles as well as to consume the remaining charcoal to increase syngas output and the $H_2/CO$ ratio.

The chamber 100 may also have a port 117 for additional biomass or organic waste charging and additional biomass or organic waste pieces are charged into the chamber 100 in a layer 118 between 0.25" to 2" over the layer 114 of the main feedstock mixture as a thermal insulator to reduce heat loss, utilize heat more efficiently and increase syngas output (FIGS. 1 and 4).

The feedstock is charged into the chamber 100 continuously in a 0.5" to 24" thick layer over the refractory base, preferably around 2.0 to 6.0" thick and then transported into the plasma reactor. Two processes happen during the heating hydrocarbon pyrolysis and in-situ reforming/thermal cracking/partial oxidation.

The feedstock pyrolized in being subjected to microwave irradiation to release exhaust gases and leave charcoal behind. The charcoal is discharged and the exhaust gases are directed into the connected PA-SF reactor.

The exhaust gases including hydrocarbons in volatile or oil vapor, steam, $CO_2$ and other gases decompose or react to form a mixture of CO and $H_2$ when subjected to high temperature plasma arcing. The excessive steam and $CO_2$ react with charcoal to form CO and $H_2$ under the high temperature with plasma gas agitating to form a syngas with the $H_2/CO$ ratio in the range from 0.5 to 3.0 and hydrocarbons, $CO_2$, $H_2O$ and $O_2$ less than 5%, preferably 1%, respectively.

The remaining charcoal is discharged out of the plasma reactor and the syngas is exported into a cleanup system to remove impurities and becoming a high quality syngas. The discharged charcoal is pulverized and a part of it is fed back as the high temperature treated carbon particles in the feedstock mixture. The remaining ash is either discharged along with the charcoal or vitrified by plasma arcing and discharged through the slag port.

Figure 5:
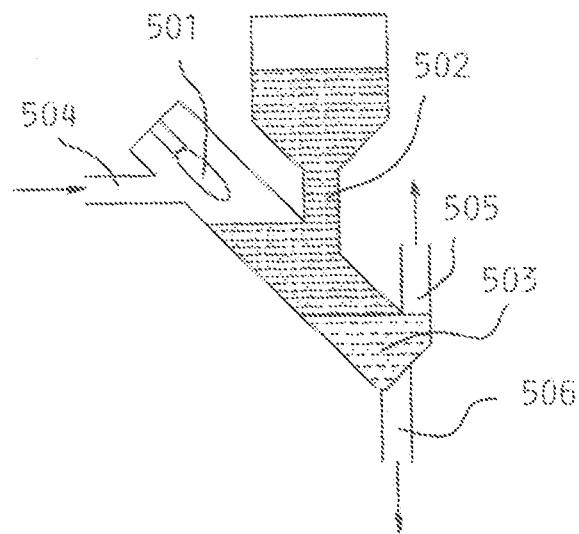
FIG. 5 is a diagrammatic representation of an auxiliary plasma heated gas reforming/carbon partial oxidation reactor.

The plasma reactor 401 may have an auxiliary gas reforming/partial oxidation reactor attached to it as seen in FIG. 5, particularly when biomass is being converted. The reaction 500 has an electric arc torch 501, a column chamber, a continuously filled fixed carbon particle bed 502, a fixed catalyst bed 503, a gas inflow opening 504 connected to the reactor 401, and a syngas outflow opening 505, and an ash discharge port 506. A part of the discharged charcoal is crushed and fed into this reactor as the fixed carbon particle bed 502.

Figure 6:
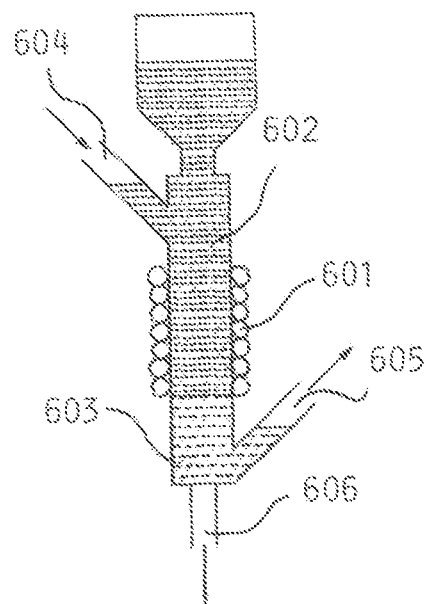
FIG. 6 is a diagrammatic representation of an auxiliary induction heated gas reforming/carbon partial oxidation reactor.
Figure 7:
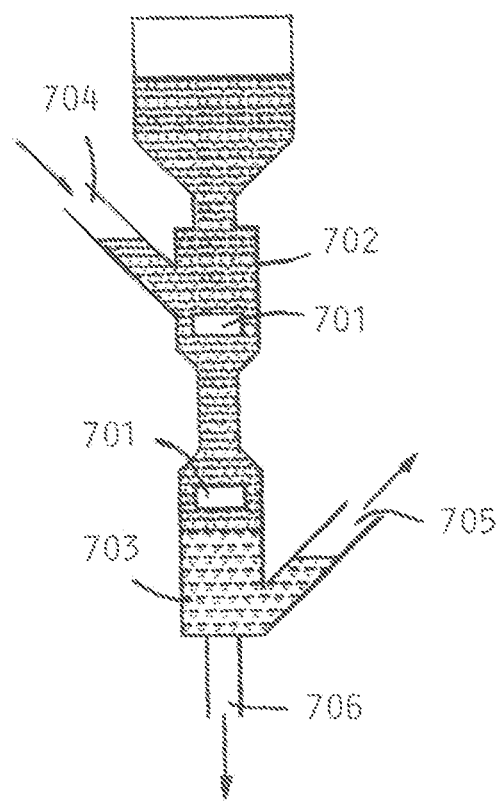
FIG. 7 is a diagrammatic representation of an auxiliary electric directly heated gas reforming/carbon partial oxidation reactor.

The plasma reactor 401 may alternatively have an auxiliary gas reforming/partial oxidation reactor 600 attached to it as seen in FIG. 6 and that reactor 600 has at least it column chamber with variable IDs, a continuously filled fixed carbon particle bed 602, an AC or DC voltage applied on the fixed carbon particle bed for heating through electrodes 601, a fixed catalyst bed 603, a gas inflow opening 604, and a syngas outflow opening 605, and an ash discharge port 606. A part of discharged charcoal is crushed and fed into that reactor as the fixed carbon particle bed.

The plasma reactor 401 alternatively may have an auxiliary gas reforming/carbon partial oxidation reactor 700 attached to it, the reactor 700 having at least one column chamber with variable IDs as shown in FIG. 1, a continuously filled fixed carbon particle bed 702, a AC or DC voltage applied on the fixed carbon particle bed for heating through electrodes 701, a fixed catalyst bed 703, a gas inflow opening 704, and a syngas opening 705, and an ash discharge port 706. A part of the discharged charcoal may be crushed and fed into the reactor as the fixed carbon particle bed 702.

The apparatus may be used for the EAF dust and BOF sludge Zn and Fe recoveries. The EAF dust or BOF sludge after drying replaces the iron ore as the main feedstock component. The operation is the same. The Zn is recovered in a powder form collected by a bag house in the syngas cleanup system. The iron is recovered as the pig iron nuggets.

The terms and expressions that have been employed in the foregoing specifications are used as terms of description and not of limitation. There is no intention, in the uses of such terms and descriptions, of excluding equivalents of the features shown and descried or portions thereof, it being recognized that the scope of the invention is defined and limited only by the claims which follow.

The invention claimed is:

1. A method for co-production of pig iron and high quality syngas from iron oxides, carbon-bearing materials, and hydrogen-containing compounds with combined microwave and plasma/electric arc heating, comprising:

forming a mixture of iron oxide particles, carbon containing particles and hydrogen-containing compounds including H2O and hydrocarbons in a form of solid particles, liquid or gas;

said iron oxide and carbon containing particles in said mixture being set to be in a ratio that enables said carbon bearing particles to remove oxygen completely from said iron oxide in reducing said iron oxide to form metallic iron having a carbon content in a range between 2.06 to 6.67% by weight;

charging said mixture as a feedstock in a 0.5" to 12" deep layer into an air tight chamber provided with microwave irradiation ports, plasma and/or electric arcs, a feedstock charging port, a pig iron solid material discharging port, and a syngas exporting port;

heating said mixture by applying microwave energy of a predetermined wavelength to said mixture in a microwave heating zone in said chamber until said mixture is rendered electrically conductive by at least a partial reduction of said iron oxide and formation of metallic iron while releasing reaction exhaust gases comprised of hydrocarbons, CO, CO2 and steam causing said mixture which has become electrically conductive and exhaust gases to move into an adjacent plasma and/or electric arcing zone within said air tight chamber;

further heating said electrically conductive mixture with added carbon particles by applying plasma and/or electric arcing in said arcing zone until achieving substantially complete reduction of iron oxides and formation of molten pig iron and slag;

creating in-situ reforming, thermal cracking and partial oxidation of substantially all of said reaction exhaust gases in said plasma and/or electric arcing zone by sufficient heating and plasma gas agitation, with metallic iron acting as a catalyst and reacting carbon particles with remaining CO2, to form a syngas almost entirely comprised of a mixture of H2 and CO;

transporting said molten pig iron and slag into an adjacent cooling zone to form solid pig iron and slag;

exporting said syngas out of said arcing zone and removing impurities therefrom to create a high quality syngas; and discharging said solid pig iron and slag through said solid material discharging port.

2. A method as defined in claim 1 further including providing said chamber with a refractory bottom layer of a thickness of at least one half the predetermined wavelength of the microwave used to irradiate said mixture and said feedstock mixture is deposited in said refractory bottom layer.

3. A method as defined in claim 2 including providing said air tight chamber with a port for bottom carbon particle charging and further including charging carbon particles into said chamber in a bottom layer ranging in depth from 0.25" to 2.0", prior to charging said mixture which is then deposited over said bottom layer of carbon particles, to act as a heat insulator between said refractory bottom layer and said molten pig iron as well as acting as a microwave receptor.

4. A method as defined in claim 1 further providing said chamber with an hydrogen containing compound injection port and further comprising injecting an additional hydrogen containing compound into said chamber to increase an H2/CO ratio in said syngas by reacting said exhaust gases with said carbon-bearing particles, and to also increase syngas output.

5. A method as defined in claim 1 further comprising providing multiple plasma/electric arcs distributed in said arcing zone in multiple rows and multiple columns with intervening arc spaces between said rows and columns extending between 0.5" and 12.0".

6. A method as defined in claim 1 further including reducing a width and/or height of said plasma/electrical arcing zone from a height and width of said microwave heating zone so that as said exhaust gases move into said arcing zone they are further heated by said high temperature plasma/electric arcing.

7. The method according to claim 1 further including setting a spacing between a ceiling of said plasma/electric arcing zone and a top surface of said mixture layer to be between 0.25" and 12".

8. The method according to claim 1 wherein heating in said plasma and/or electrical arcing zone is sufficient to form molten pig iron and substantially complete in-situ reforming, thermal cracking and partial oxidation of said reaction exhaust gases to produce a mixture of H2 and CO.

9. A method as defined in claim 1 further including providing a port in said chamber for biomass or organic waste charging, and further including charging biomass or organic waste pieces into said chamber in a layer between 0.2" to 2" over the layer of said mixture to provide a thermal insulator to reduce heat loss, utilize heat more efficiently and increase syngas output.

10. The method according to claim 9 further including heating said biomass or organic waste in said microwave heating zone so to release exhaust gases and leave a charcoal layer in said chamber.

11. A method as defined in claim 10 further including providing said chamber with a charcoal discharging port before said plasma and/or electric arcing zone and further comprising discharging said charcoal produced by said heating of said biomass/organic waste.

12. A method as defined in claim 1 further including providing said vessel with at least one dynamic material curtain to isolate said feedstock charging port from said syngas exporting port to facilitate uni-directional flow toward said syngas exporting port.

13. A method as defined in claim 1 further including providing said chamber with an electric induction heating zone beyond said plasma and/or electric arcing zone and further comprising the step of smelting molten pig iron and slag completely therein after leaving said plasma and/or electric arcing zone.

14. The method according to claim 1 wherein the size of said iron oxide and carbon bearing particles are set to be at 100 mesh or finer in size.

15. The method according to claim 1 wherein a ratio of components of said mixture is controlled to produce metallic iron with about a 4.3% carbon content.

16. The method according to claim 1 wherein said mixture is charged into said air tight chamber to form a layer 1.5 inches deep.

17. The method according to claim 1 wherein said syngas is formed so that a ratio of $H_2$ to CO is in the range of 0.5 to 3.0.

18. The method according to claim 1 wherein hydrocarbons, CO2, H2O and O2 content is set to be less than 5% by weight of said syngas.

19. The method according to claim 1 wherein coal comprises the carbon bearing particulates, said coal containing volatiles comprising said hydrocarbons, including methane, and moisture absorbed in said coal comprising said H2O in said mixture.

20. A method of concurrently forming pig iron and syngas by creating a mixture of coal particles and iron oxide particles, said coal particles containing hydrocarbon volatiles and moisture, the coal in said coal particles being sufficient to reduce all of said iron oxide and having unreacted coal particles remaining after reduction;
heating said mixture in a first heating zone in an air tight chamber to partially reduce said iron oxide with carbon and with CO formed in said first heating zone, while releasing steam and hydrocarbon volatiles included in reaction gases;
causing said reduced iron oxide and unreacted coal and reaction gases to move from said first heating zone into a second heating zone in said chamber and subjecting said partially reduced iron oxide and reaction gases to further heating by operation of one or more electric plasma torches sufficient to complete said reduction of said iron oxide particles and to melt iron from said reduced iron oxide, reacting CO2 formed by reduction of said iron oxide with said unreacted coal to form CO, and forming hydrogen and CO from said hydrocarbons by reacting, cracking and reforming of components of said hydrocarbons thereby forming syngas comprised almost entirely of H2 and CO.

21. A method as defined in claim 20 further including charging carbon particulate into a hearth in the chamber in a layer between 0.25" to 2.0", prior to charging said mixture of iron oxide particles and coal particles as an insulator as well as a microwave receptor.

22. A method as defined in claim 20 further including injecting an additional hydrogen-containing compound into said chamber to increase the quality and quantity of syngas produced.

23. A method as defined in claim 20 wherein a port for biomass or organic waste charging is provided on said chamber and further comprising charging biomass or organic waste pieces into said chamber in a layer between 0.25" to 2" over said mixture of iron oxide particles, carbon-bearing particles and hydrogen-containing compounds as a thermal insulator to reduce heat lost, utilize heat more efficiently and increase syngas output and heating said biomass or organic waste pieces to release exhaust gases and leave a charcoal layer.

24. The method as defined in claim 23 further comprising discharging said charcoal layer prior to transport of said mixture to said second heating zone and pulverizing said charcoal in said layer to finer than 100 mesh and adding said pulverized charcoal to said coal particles in said mixture.

25. A method as defined in claim 20 further comprising the step of pulsing a gas to break up molten pig iron streams into solid pieces.

26. A method as defined in claim 20 wherein said iron oxide particles include Electro Arc Furnace dust or Basic Oxygen Furnace sludge, which contains sludge and wherein any zinc in said dust or sludge is reduced, melted, vaporized and collected in a bag house installed in a syngas cleanup system.

27. A method for direct conversion of biomass and organic waste to high quality syngas from various biomasses, organic wastes, and hydrogen-containing compounds with unique combined microwave and plasma and/or electric arc heating comprising:
processing a bulk or organic waste to pieces smaller than 2.0";
providing carbon particles smaller than 2 mesh as a microwave receptor;
providing other hydrogen-containing compounds in either solid particles, liquid or gas;
mixing the above materials to form a mixture in a ratio to be able to absorb microwave energy effectively and result in a syngas with a $H_2$/CO ratio in a range of from 0.5 to 3.0;
charging said mixture in a 0.5" to 23" layer continuously into an air tight chamber with multiple microwave irradiation ports, arrayed plasma/electric arcs, a feedstock charging port, a charcoal discharging port, and a syngas exporting port;
heating said mixture by applying microwave energy until pyrolysis of said mixture is complete and resulting in charcoal while releasing exhaust gases;
transporting said charcoal into an adjacent plasma and/or electric arcing zone;
forcing said exhaust gases to pass through said constraint plasma/electric arcing zone;
conducting in-situ reforming, thermal cracking and partial oxidation to said exhaust gases in said plasma/electric arcing zone to form a syngas with a H2/CO ratio in the range from 0.5 to 3.0 and hydrocarbons, CO2, H2O and O2 less than 5% by weight;
transporting said charcoal into an adjacent cooling zone to cool;
exporting syngas into a cleanup system to remove impurities; and
discharging said charcoal through said charcoal discharging port in said chamber.

* * * * *